United States Patent
Barry et al.

(10) Patent No.: US 9,892,486 B2
(45) Date of Patent: Feb. 13, 2018

(54) DATA PROCESSING

(71) Applicant: International Business Machines Corporation, Armonk, NY (US)

(72) Inventors: Paul M. J. Barry, Cork (IE); Natalia Udaltsova, Cork (IE)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/886,280

(22) Filed: Oct. 19, 2015

(65) Prior Publication Data
US 2017/0109862 A1 Apr. 20, 2017

(51) Int. Cl.
*G06T 3/40* (2006.01)
*G06T 11/20* (2006.01)

(52) U.S. Cl.
CPC .......... *G06T 3/40* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 6,593,862 B1* | 7/2003 | Wong; Joseph D | .... | H03M 7/30 341/50 |
| 7,629,975 B2* | 12/2009 | Buck | ...................... | G06Q 30/06 345/440 |
| 8,228,330 B2 | 7/2012 | Alsbury et al. | | |
| 8,773,436 B1 | 7/2014 | Hao et al. | | |
| 2007/0206680 A1* | 9/2007 | Bourge | ...................... | G06T 3/40 375/240.21 |
| 2011/0199285 A1* | 8/2011 | Kantorov | ............. | G01R 13/029 345/55 |
| 2013/0030759 A1* | 1/2013 | Hao | ........................ | G06F 17/18 702/179 |
| 2013/0212142 A1* | 8/2013 | Martinez Heras | ...... | G06F 17/17 708/290 |
| 2014/0059456 A1* | 2/2014 | van der Elzen | ...... | G06T 11/206 715/764 |
| 2016/0292233 A1* | 10/2016 | Wilkinson | .......... | G06F 17/3053 |

OTHER PUBLICATIONS

S. Steinarsson, "Downsampling time series for visual representation", M. Sc. thesis University of Iceland (2013) http://hdl.handle.net/1946/15343.*
Singh et al., "Studies in Sampling Techniques and Time Series Analysis", Zip Publishing 2011, pp. 1-72.
Hao et al., "Multi-Resolution Techniques for Visual Exploration of Large Time-Series Data", EUROVIS 2007: Eurographics/IEEE VGTC Symposium on Visualization : Norrköping, Sweden, May 23-25, 2007, pp. 27-34.

(Continued)

*Primary Examiner* — Yu Chen
(74) *Attorney, Agent, or Firm* — Samuel A. Waldbaum

(57) ABSTRACT

A computer-implemented method of down-sampling time series data for display is described. The method comprises a step of determining an absolute distance between a previous data point in the series and the present data point, and discarding the present data point if the determined absolute distance is less than a threshold value. The threshold value is dependent on a data value range for the time series data, and a size of a display area within which the time series data is to be displayed.

17 Claims, 8 Drawing Sheets

(56) References Cited

OTHER PUBLICATIONS

Oliveira et al., "Enabling visualization of large telemetry datasets", 2012, http://www.spaceops2012.org/proceedings/documents/id1275174-Paper-003.pdf, pp. 1-12, Captured Jun. 26, 2015.
Milutinović, "Zoomable Interactive Time Series Visualization", captured Jun. 26, 2015, http://vis.berkeley.edu/courses/cs294-10-fa13/wiki/images/0/00/Mitar-Paper.pdf, pp. 1-8.
Black Ops Blog, "Time-series Graphs and Downsampling", May 13, 2014, http://blackops.io/blog/2014/05/time-series-graphs-and-downsampling/, pp. 1-13.
Wikipedia, the free encyclopedia, "Digital Signal Processing", printed on Oct. 1, 2015, https://en.wikipedia.org/wiki/Digital_signal_processing#Signal_sampling, pp. 1-6.

* cited by examiner

DATA PROCESSING

BACKGROUND

The present invention relates to a data processing apparatus and method for down-sampling time series data for display.

The advent of big data has resulted in massive amounts of time series data that may cover a wide period of time with a large number of measurements. Line series charts are commonly used to display time series data in an understandable manner.

SUMMARY

According to an aspect of the present invention, there is provided a computer-implemented method of down-sampling time series data for display. The method comprises a step of determining an absolute distance between a previous data point in the series and the present data point, and discarding the present data point if the determined absolute distance is less than a threshold value. The threshold value is dependent on a data value range for the time series data, and a size of a display area within which the time series data is to be displayed.

Other aspects of the present invention include an apparatus for down-sampling time series data and a computer program for same.

DETAILED DESCRIPTION

Figure 1:
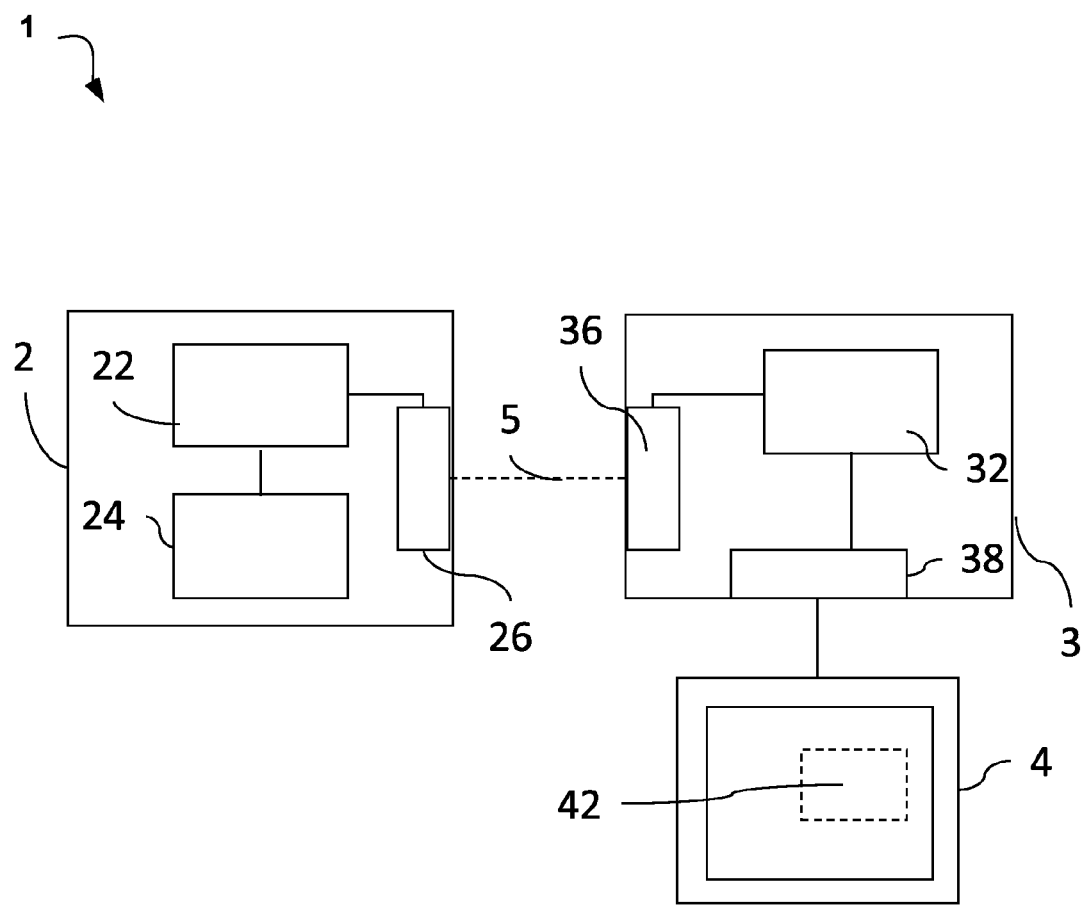
FIG. 1 schematically illustrates a server and client device communicating via a network.

With reference to FIG. 1, a data processing system 1 comprising a server 2 and a client PC 3 is schematically illustrated. The server 2 comprises a processor 22, a memory 24 and a network interface 26. The client PC 3 comprises a processor 32, a network interface 36 and a display controller 38. The client PC 3 is connected to a display device 4 via the display controller 38. The server 2 and the client PC 3 are able to communicate with each other via a network 5 to which the network interfaces 26, 36 are both connected. It will be appreciated that other components may be present, but need not be described here since they may be of conventional nature and are not helpful in explaining the operation of the present technique.

In operation, the processor 22 of the server 2 retrieves time series data from the memory 24, and processes it to down-sample or thin the data points, before outputting the down-sampled time series data onto the network 5 via the network interface 26. The processor 32 of the client PC 3 retrieves the down-sampled time series data from the network 5 via the network interface 36, and outputs it for display on the display device 4 via the display controller 38. While the time series data may be displayed on a line graph full screen, in the present example the time series data is outputted for display in a display area 42, which may for example be in a window. As will be explained below, the down-sampling process utilizes information regarding the size and/or resolution of the display area within which the time series data is to be displayed. If displayed full screen the display area may correspond to the full screen area of the display device 4, but if displayed in a window the display area may correspond to the size of the window. As a result, the client PC 3 may communicate to the server 2, again via the network 5, an indication of the size and/or resolution of the display area within which the time series data is to be displayed.

Figure 2:
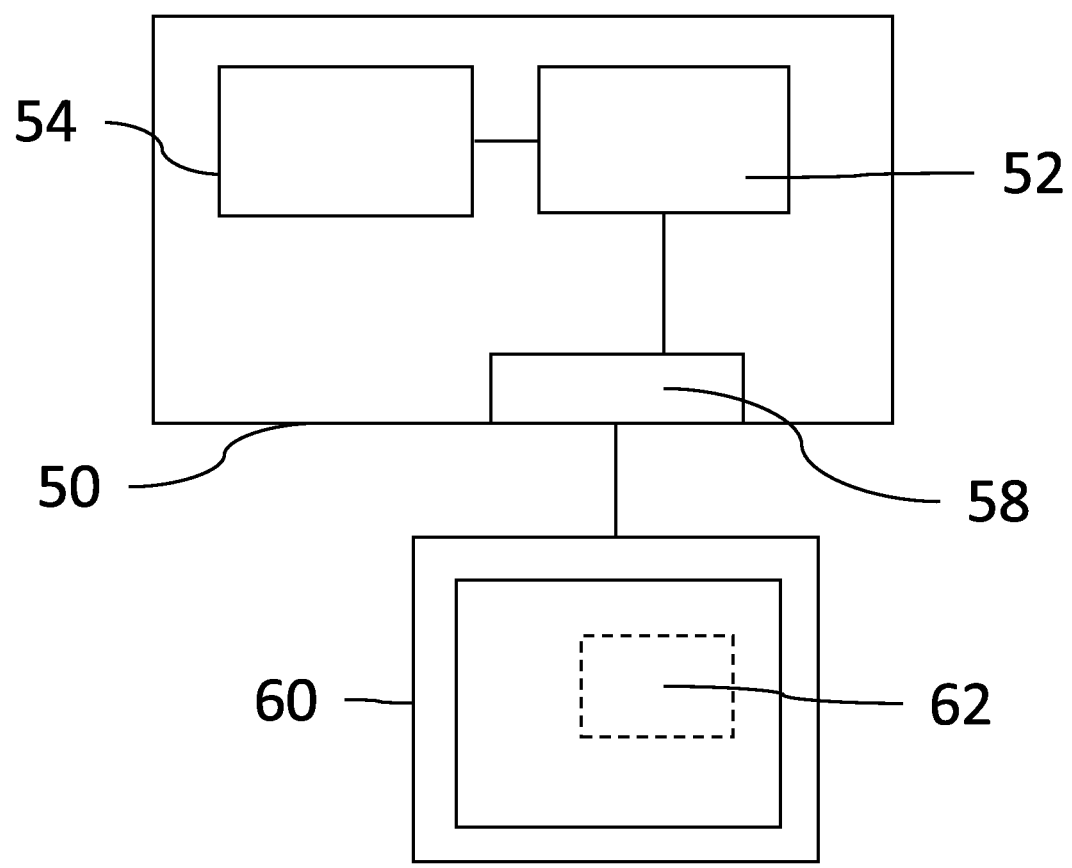
FIG. 2 schematically illustrates a PC device.

With reference to FIG. 2, a data processing apparatus 50 can be seen to comprise a processor 52, a memory 54 and a display controller 58. The data processing apparatus 50 is connected to an external display 60 via the display controller 58. It will be appreciated that other components may be present, but need not be described here since they may be of conventional nature and are not helpful in explaining the operation of the present technique.

In operation, the processor 52 of the data processing apparatus 50 retrieves time series data from the memory 54, and processes it to down-sample or thin the data points, before outputting the down-sampled time series data for display on the external display device 60 via the display controller 58. While the time series data may be displayed on a line graph full screen, in the present example the time series data is outputted to display in a display area 62, which may for example be in a window. As will be explained below, the down-sampling process utilizes information regarding the size and/or resolution of the display area within which the time series data is to be displayed.

Down-sampling is conducted because it is challenging to process and display large amounts of data on a line series chart due to the number of data points available. A goal of down sampling is to have the user make the same determination from fewer data points.

Common and non-limiting existing techniques include the following:

Reduction sampling: Simply take a percentage of the points and discard the remainder. It will be appreciated that key data points may be missed as a result.

Aggregation: The number of points is reduced by aggregating points together. For example, the maximum value of every three points could be taken, or the average. This has the effect of distorting the data and either smoothing the line (using an average) or exaggerating the deviations (using the maximum).

Mode Median Bucket: Divide the data into a series of buckets and pick the data points with the highest frequency, unless the global maximum/minimum is in there, in which case pick that. The initial selection of the buckets can result in the loss of important data as the number of points taken from each bucket is constant.

Longest Line Bucket: Aim to keep the total length of the line drawn the same before and after sampling. Again the initial selection of the buckets can result in the loss of important data as the number of points taken from each bucket is constant.

Largest Triangle dynamic: Here the size of the buckets are calculated dynamically so that smaller buckets can be used in areas of high variance (and higher potential data loss) and larger buckets can be used in areas of low variance (and lower potential data loss). This is dependent on the arbitrary selection of the number of buckets.

It should be appreciated that the present invention, in accordance with preferred embodiments, does not necessarily address nor solve all the problems presented by these common existing techniques.

Figure 3A:
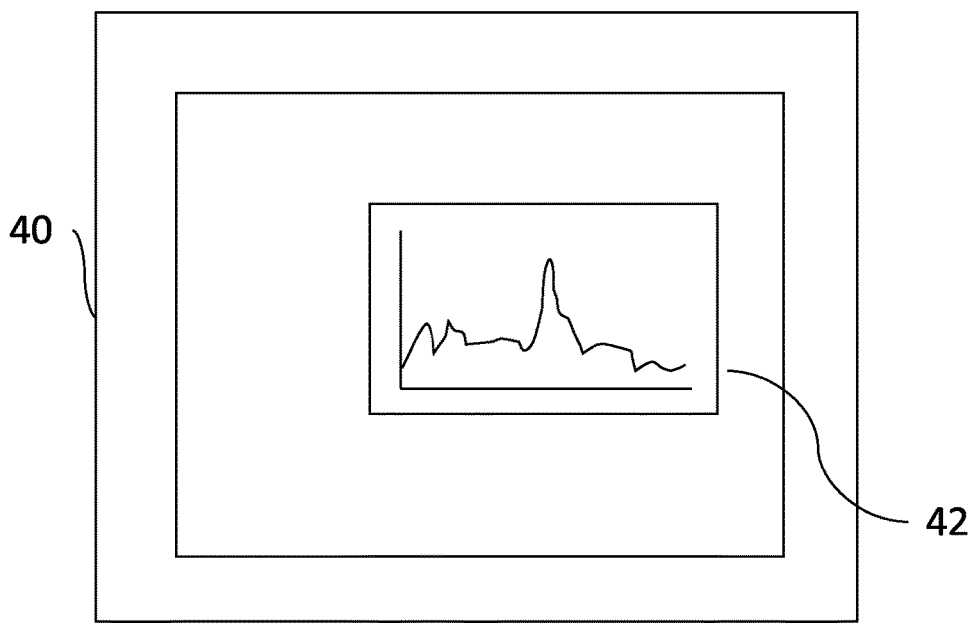
FIGS. 3A and 3B schematically illustrate two display area sizes within which time series data is to be displayed.
Figure 3B:
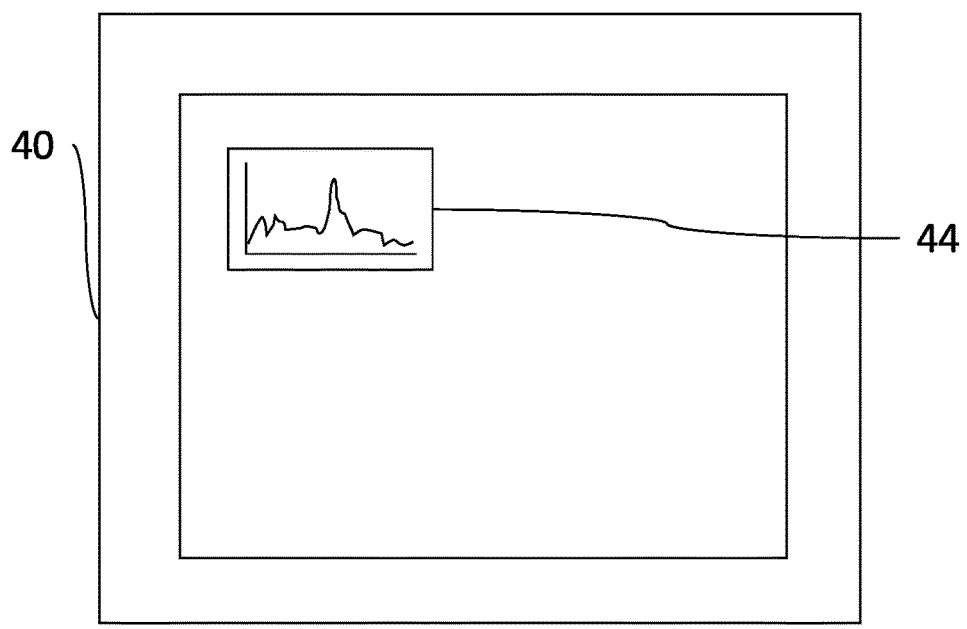

Referring to FIGS. 3A and 3B, a display device 4 is shown. In FIG. 3A, a relatively large display area 42 is shown within an external display such as external display 40. In FIG. 3B, a relatively small display area 44 is shown within the same external display 40. It will be appreciated that the smaller the display area, the more challenging it is to display a large number of data points. It may therefore be desirable to down-sample a data set more for display in the display area 44 than for display in the larger display area 42.

In contrast with the above techniques, some embodiments of the down-sampling technique proposed herein look at each point in sequence and choose to keep or discard it immediately. This allows for effective optimization with acceptable loss. It can be used to achieve aggressive down sampling where loss will be low and very conservative down sampling where loss would be high. Rather than down sampling to a specific number of points, the down sampling can be controlled to retain useful information and discard less useful information. It will be appreciated that the present invention does not necessarily solve or even seek to solve all problems associated with the aforementioned techniques, and that different embodiments of the present invention may address different problems.

Figure 4:
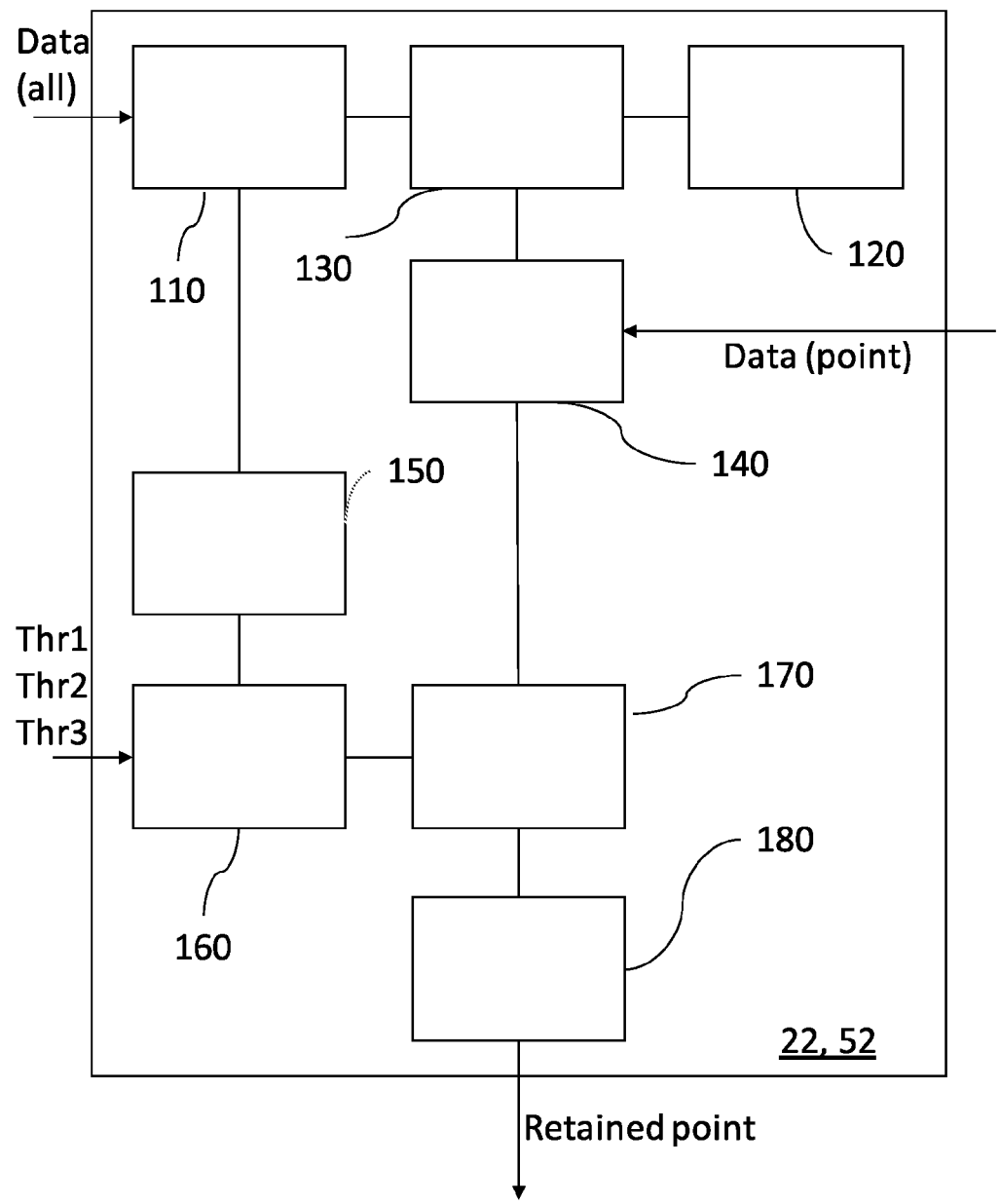
FIG. 4 is a schematic block diagram of the functional processing blocks of a processor of either FIG. 1 or FIG. 2.

FIG. 4 is a schematic block diagram of the functional blocks of the processor 22 of FIG. 1 or the processor 52 of FIG. 2. The components of FIG. 4 will now be briefly introduced, and their function, subsequently, described in detail with reference to FIGS. 4 and 5 in combination. In FIG. 4, a data analyzer 110 is provided which is operable to receive, as an input, all of the data of a data set to be thinned. A display area determiner 120 is provided which is operable to determine a display area (height and width in pixels) within which a thinned data set is to be displayed. The outputs of the data analyzer 110 and display area determiner 120 are made available to a pixel/unit ratio calculator 130, which is operable to calculate a pixel to data value and pixel to time interval ratio based on this information. An absolute distance calculator 140 is operable to determine an absolute distance between two data points based on the output of the pixel/unit ratio calculator and on the values (e.g. x and y values) of the two data points (current and most recently retained), which are provided to the absolute distance calculator 140 sequentially point by point (in contrast to the data analyzer, which considers the data together as a set).

An anomaly detector 150 is operable to detect when a current data point is in an anomalous data area based on analysis conducted by the data analyzer 110, and an indication of this is made available to a threshold selector 160, which is operable to select between three predetermined thresholds Thr1, Thr2, Thr3 based on whether the current data point is in an anomalous area, a normal area, or a transition region between the two. A comparator 170 is operable to compare the absolute distance calculated by the absolute distance calculator 140 with the threshold selected by the threshold selector 160. Based on the results of this comparison, a thinner 180 is operable to select whether to retain or discard the data point, and if retained then to output the retained point for storage and/or display.

Figure 5:
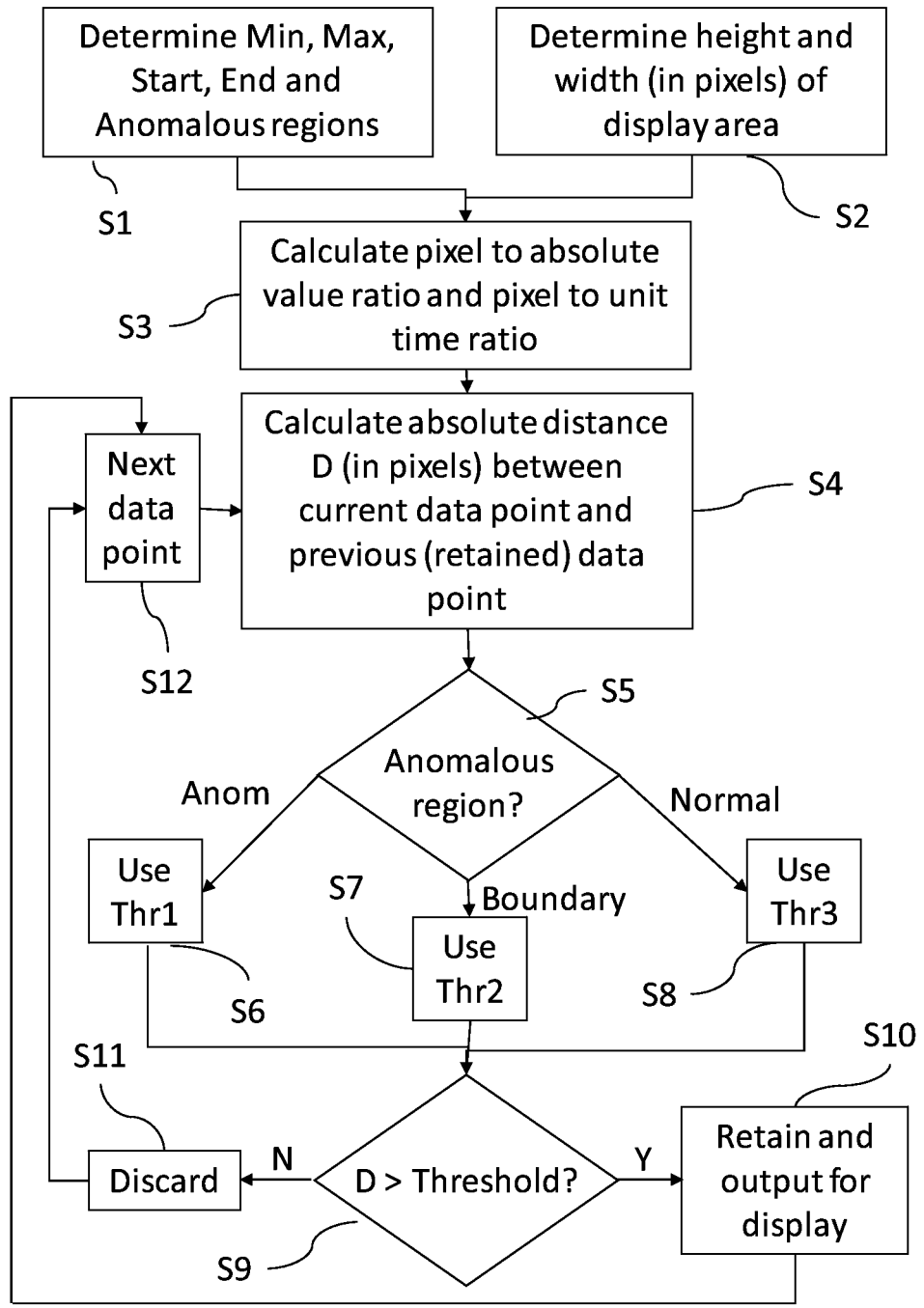
FIG. 5 is a schematic flow diagram of the basic down-sampling procedure.

FIG. 5 is a schematic flow diagram which explains the core of this approach to down sampling, with reference to the functional blocks of FIG. 4. First, at a step S1, the data analyzer 110 processes the data set once to determine the minimum value, the maximum value and any anomalous areas of interest within the dataset if this information is not already available. It should be understood that this information may well already be available from an anomalous point/region analysis process. The data analyzer also identifies the start time and end time of the data set. It will be understood that together, the maximum and minimum values define the absolute range of the data values within the dataset. This may for example be the range which is required to be represented on a vertical axis of a line graph. It will be further understood that together, the start and end times define the temporal extent of the data points to be displayed at one time in the display area. This may not be the start and end times of the full data set, but potentially of a temporal window within the data set. In the latter case, the duration of the temporal window may be fixed, or may be user selectable through a graphical user interface. In the case of the FIG. 1 embodiment, a user selection of a temporal window duration may be sent by the processor 32 to the processor 22 via the network 5.

At a step S2, the size of the display area that will display the visualization of the data is determined by the display area determiner 120, this information being readily available either based on the hardware screen size (for full screen) and resolution, or based on software processes which control window size within a display area. In particular the height (vertical size) and width (horizontal size) of this area, in both cases measured in pixels, are determined by the display area determiner 120. In the case of the FIG. 1 embodiment, this information is known to the processor 32, which controls the display of information onto the display device 4, and is communicated from the processor 32 to the processor 22 via the network 5. In the case of the FIG. 2 embodiment the processor 52 is aware of this information, and is also handling the down-sampling algorithm.

At a step S3, the pixel/unit ratio calculator 130 calculates the duration of the chart to be displayed, measured in seconds (although it will be appreciated that any unit of time could be used, depending on context), by subtracting the start time from the end time. The pixel/unit ratio calculator 130 then calculates a pixel to second ratio based on the duration of the chart in seconds in conjunction with the width of the chart in pixels. This can be achieved by dividing the width of the chart in pixels by the duration of the chart in seconds.

Also at the step S3, the pixel/unit ratio calculator 130 calculates the data range to be displayed by subtracting the minimum data value from the maximum data value (the difference between the maximum and minimum of the chart gives the absolute value the chart transverses). The pixel/unit ratio calculator 130 then calculates a pixel to absolute value ratio based on the data range in conjunction with the height of the chart in pixels. This can be achieved by dividing the height of the chart in pixels by the absolute value of the range.

The pixel to second ratio and pixel to absolute value ratio can be used downstream in determining an absolute distance (in pixels) between any two data points in the data set.

The steps S1, S2 and S3 need be conducted only once for a data set, unless the display area is resized, or the duration of the time window within the data to be displayed is changed. In this case the steps S1, S2 and S3 would be conducted again with the new parameters, and the entire data set (or a selected portion of the data set) would be down-sampled again. The remaining steps are conducted sequentially for each data point except the first (which is typically retained by default).

At a step S4, the absolute distance calculator 140 calculates an absolute distance d, in pixels, between a current data point and a previous data point. The previous data point will be a retained data point, and any discarded data points will be ignored for this purpose. Once the absolute distance d has been calculated, it is possible to determine whether the current data point is to be retained (and displayed) or discarded. This involves comparing the distance d with a threshold. The threshold used depends on whether the current data point is in an anomalous region of the data set, or in a normal region, or in a boundary region between the two. This process comprises the following steps. At a step S5, the anomaly detector 150 determines, from the information acquired by the data analyzer 110 at the step S1, whether the current data point is within an anomalous region, a boundary region (immediately before or after an anomalous region) or a normal region. If in an anomalous region, a threshold Thr1 is selected by the threshold detector 160 at a step S6. If in a boundary region, a threshold Thr2 is selected by the threshold detector 160 at a step S7. If in a normal region (that is, neither in an anomalous region nor a boundary region) then a threshold Thr3 is selected by the threshold selector 160 at a step S8. In each of these cases, the threshold is representative of an acceptable level of loss, measured in pixels. In general, the thresholds Thr1, Thr2, Thr3 are fixed predetermined values, which represent how much loss of visual information is acceptable within the region in question. However, in some cases the thresholds might be varied in relation to some other parameter. For example, the threshold Thr1 in an anomalous area might be set in dependence on the degree of deviation of a data point from its expected value. This example will be considered in more detail below. In any case, at a step S9, the comparator 170 compares the distance d calculated in the step S4 with the threshold Thr1, Thr2 or Thr3 selected at the step S6, S7 or S8 by the threshold selector 160. If the distance d is evaluated to be less than the relevant threshold, then the thinner 180 discards the current data point (which is therefore not displayed) at a step S10. If however the distance d is evaluated to be greater than or equal to the relevant threshold, then the thinner 180 retains the current data point, and outputs the same for display. Following either the step S10 or S11, the algorithm progresses onto consideration of the next data point (in time) in the sequence at a step S12. Flow then returns to the step S4.

Figure 6A:
FIGS. 6A, 6B and 6C schematically illustrate a point by point consideration of whether to retain or discard data points.
Figure 6A:
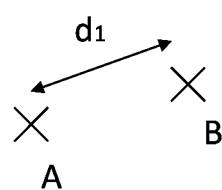
Figure 6B:
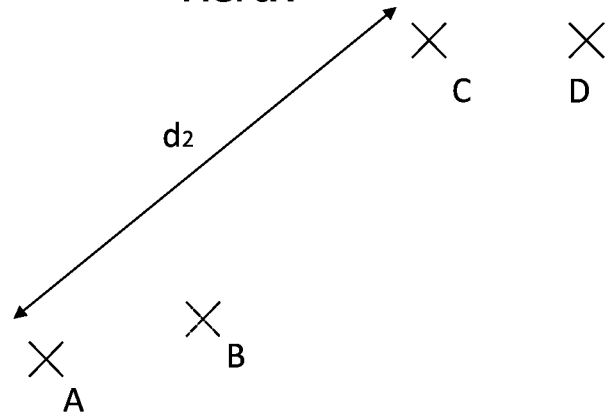
Figure 6C:
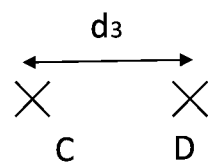
Figure 6C:
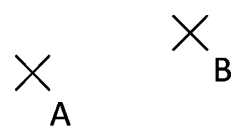

To assist with understanding, the steps S4, S9, S10, S11 and S12 are described in more detail now with reference to FIGS. 6A, 6B and 6C.

In FIGS. 6A, 6B and 6C, four data points A, B, C and D in increasing time order are shown (indicated here by crosses). In FIG. 6A, a distance d1 between the points A and B is calculated. It will be appreciated that the x, y position in the data set for each of points A and B is known, with x corresponding to the temporal position of the data point and y corresponding to its data value.

Position of A: $(x_1, y_1)$, Position of B: $(x_2, y_2)$, Position of C: $(x_3, y_3)$, Position of D: $(x_4, y_4)$ Pixel to time ratio: $X_R$, Pixel to absolute value ratio: $Y_R$ Distance, $d_1$ between pixels A and B:

$$d1 = \sqrt{(X_R(x_2-x_1))^2 + (Y_R(y_2-y_1))^2}$$

In other words, by multiplying the difference in time between data points A and B with the pixel to time ratio $X_R$, a distance in pixels in the x axis direction can be determined. Similarly, by multiplying the difference in absolute value between data points A and B with the pixel to absolute value ratio $Y_R$, a distance in pixels in the y axis direction can be determined. Based on these x and y axis distances, the absolute distance between the points A and B (a straight diagonal line $d_1$) can be found by Pythagoras.

The absolute length (distance $d_1$) is then compared with the appropriate acceptable loss threshold (that is, one of Thr1, Thr2, Thr3). In the present case $d_1$ is found to be less than the acceptable loss threshold, and so the point B is discarded.

In FIG. 6B, point B is still visible, but in hashed lines to demonstrate that it has been discarded. A distance $d_2$, between the data points A and C is then evaluated by the processor, using the same technique. In this case, the distance $d_2$ is found to be greater than the threshold, and so the point C is retained and displayed. Then next data point, D will then be considered. Referring to FIG. 6C, for data point D, the distance evaluated $d_3$ is that between data point C (the previously retained data point) and data point D. This process continues through the data set until all data points have been evaluated.

Figure 7:
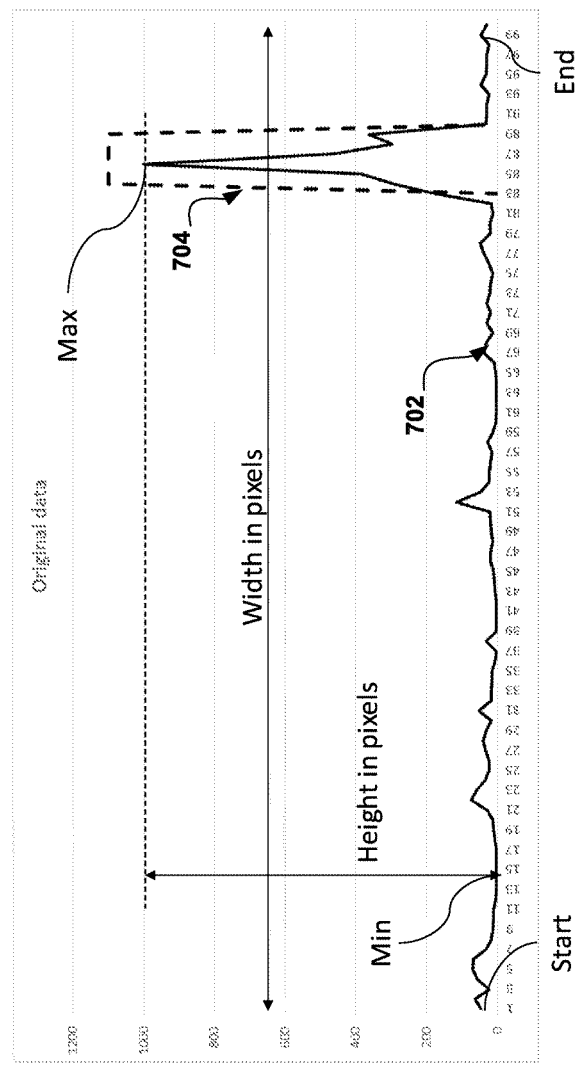
FIG. 7 schematically illustrates an original time series data set expressed on a line chart.

Referring to FIG. 7, an original data set is shown presented on a line graph (data set 702). Marked on the line graph are the start time of the data set (0) and the end time of the data set (99), as well as the minimum value (0) of the data in the set and the maximum value (1000) of the data in the set. These are the parameters obtained in the step S1 above. In the example data set above, there are 100 data points, or samples, represented. A dashed area to the right of the graph (area 704) is an anomalous area determined (again at the step S1) to include anomalous data points, and to thus be an area of interest. Acceptable loss in "interesting" areas is typically set to less than acceptable loss in uninteresting areas, so that potentially important information is not lost.

Figure 8A:
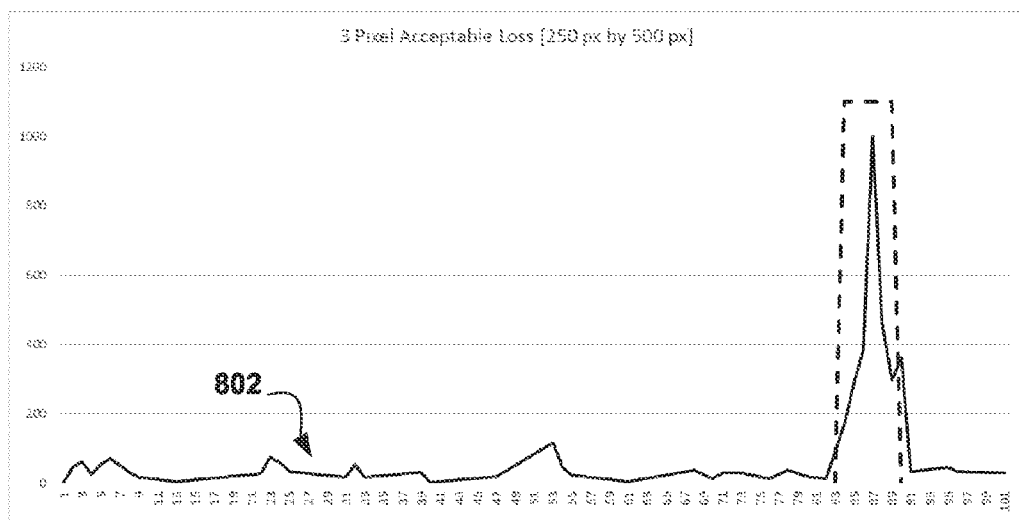
FIGS. 8A and 8B schematically illustrate two down-sampled versions of the original data set of FIG. 7.

Referring to FIG. 8A, a down-sampled version of the data set 702 of FIG. 7 is presented on line graph 802. In this case the display/visualization area is 250 pixels (height) by 500 pixels (wide). The acceptable loss (threshold) is set to 3 pixels for the normal area, but down-sampling has not been applied in the anomalous area within the dashed lines. It will be appreciated that, rather than not applying down sampling at all within the anomalous area, down-sampling could take place at a lower threshold—for example one or two pixels instead or three pixels.

By comparison of FIG. 8A with FIG. 7, it can be seen that there is less detail in the "normal" area of the graph, but that there has been no loss of detail in the anomalous area. Even in the normal area, the present technique results in a general trend which is mostly faithful to the original data.

Figure 8B:
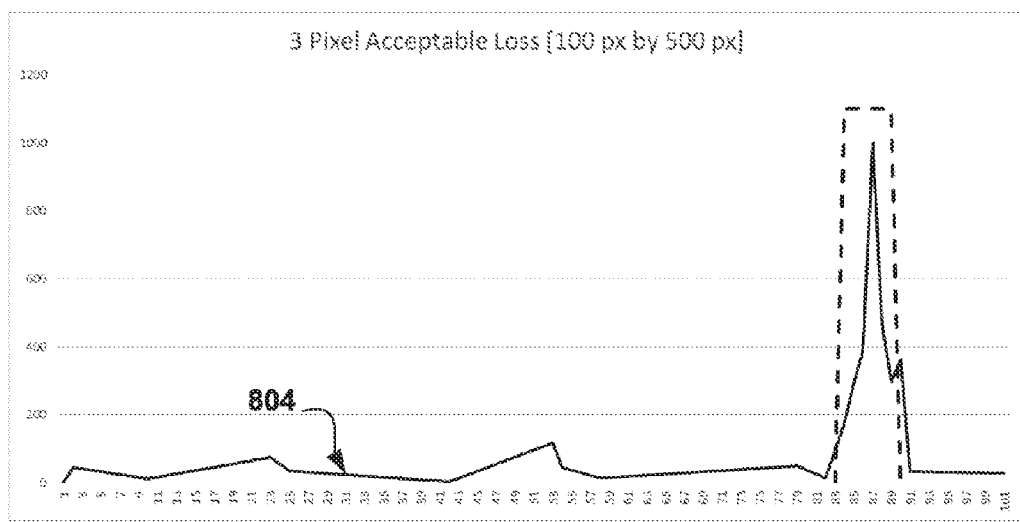

Referring to FIG. 8B, another down-sampled version of the data set 702 of FIG. 7 is presented on line graph 804. In this case the display/visualization area is 100 pixels (height) by 500 pixels (wide). The acceptable loss (threshold) is again set to 3 pixels for the normal area, but down-sampling has not been applied in the anomalous area within the dashed lines.

By comparison of FIG. 8B with FIG. 8A, it can be seen that there is less detail in the "normal" area of the graph, due to the fact that the display area has been shrunk in the vertical direction, but that again there has been no loss of detail in the anomalous area. The same principle would apply if the difference between the maximum and minimum values were to be increased. Even in the normal area, the present technique results in a general trend which is mostly faithful to the original data. In particular, the wave in the majority of the line is visually reduced, but the sections of the chart that stand out more clearly are the maximum and minimum points and the anomalous area.

While acceptable loss is described here generally as being measured in pixels, in which case down-sampling increases as the visualization space shrinks, it could also be measured as a percentage, which keeps the key shapes but will down-sample more as the visualization space grows.

Where acceptable loss is measured in absolute pixels, the number of absolute pixels can be calculated based between two points based on the information that has been provided. Acceptable loss in interesting (anomalous) areas will be lower than in less interesting (not anomalous) areas.

Generally, FIGS. 7, 8A and 8B show how greater down-sampling occurs as the visualization space is reduced, but the important elements in the shape are maintained. The acceptable loss threshold is set to achieve this. Acceptable level of loss may be fixed or user specified. In the latter case for example, a user may modify the acceptable loss threshold from 3 pixels to 2 pixels if the displayed data does not initially convey sufficient meaning. The processor 22, 52 may in this case be responsive to the updated acceptable loss threshold to re-conduct the down-sampling process and reissue the data points for display.

If the nature of the data is such that many points are outside acceptable loss and thus retained, then the data is inherently not suitable for down sampling, and down sampling will introduce significant information loss. Other techniques force the down sampling into a specified number of points irrespective of the potential loss of data.

As a result of the fact that each data point is evaluated in sequence, in the case of large data sets data can be streamed to a requester immediately once the decision on a point is made. It does not require a bucket, or segment of data to be fully analyzed before a result is obtained, although it will be appreciated that the initial analysis of the data set out in the steps S1 to S3 above will need to be conducted first. In the context of the FIG. 1 embodiment, this would enable the client device to start displaying points of data before the server device has finished processing and transmitting all the points to the server device.

To summarize the above: The maximum and minimum values of the chart define the absolute distance between the outlying points. When the physical size available to plot the chart is taken into account it is possible to determine the number of pixels between given points based on their absolute values. The size in pixels is used to determine the degree to which a user can actually see that down sampling has occurred and identify the point at which loss is no longer acceptable.

As the algorithm moves from one point to the next it is possible to identify the risk of loss of useful information, and decide if the point should be retained or discarded. The anomalous periods are used to identify areas of the chart of high interest and conservative down sampling takes place within these areas and preferably in proportional areas on either side (otherwise entry into and exit from anomalous areas may be exaggerated).

This technique provides a cheap and simple approach that aggressively down samples where there will be little loss of useful information and conservatively down samples where there will be high loss of useful information. This technique uses the visual area available to display the chart as a means for determining how aggressively down sampling can occur without introducing noticeable loss.

Some embodiments may provide a simplified approach for down sampling to an acceptable point of data loss based on the results of analytics already or readily available that describe the data and the size of the visualization area.

Some characteristics of this technique are as follows:
  A. Acceptable loss measured in pixels ("acceptable visual loss") is used to determine when and where down sampling can occur. Inputs for the visualisation (height/width) are used along with limits of the data to calculate the appropriate degree of down sampling.
  B. Down-sampling results can be streamed as point by point calculations are completed. As there are no buckets, or groupings each point is considered for down sampling as it is encountered. It relies only on the previously selected point. This allows for immediate streaming of results in the case of large datasets.
  C. Known additional information about the data (for example already identified anomalous periods) can be used to apply flexible down sampling (aggressive where uninteresting, conservative where interesting). This improves the likelihood of retaining information that the user may wish to action and increases the amount of down sampling that can take place.

It will be understood from FIG. 1 that the downsampling may be carried out on one apparatus, while the display of the downsampled time series data may be carried out on a separate apparatus. In this case, an embodiment of the invention may be a system for downsampling time series data for display, the system comprising a first apparatus and a second apparatus. The first apparatus may in this case have a processor for determining an absolute distance between a previously retained data point in the series and the present data point, and discarding the present data point if the determined absolute distance is less than a threshold value. The second apparatus receives the downsampled time series data from the first apparatus, and has a display for displaying the downsampled time series data. In the same way as for an implementation on a single apparatus, the threshold value used for a system variant may be dependent on a data range for the time series data, and a size of a display area within which the time series data is to be displayed.

Anomaly Detection can be used to identify the anomalous areas. In essence anomaly detection is where an amount of data is analyzed. When this data is examined over some axis, for example time, and any data that is unusual compared to the rest of the data is considered to be anomalous. When this state is detected then some action can occur. An event can be sent, the data can be monitored for a time before taking further action. It is also possible to detect anomalies when comparing different data measures. For example if two separate measures always trend together—go up, go down, stay the same then when these two measures begin to behave differently (one goes up and the other goes down), this can be consider anomalous behavior. Such techniques are generally known to the skilled person.

As well as to identify the anomalous areas, anomaly information can also be used to set the acceptable loss thresholds.

For example, the following two situations (examples only) can be considered:

Sigma Deviation: A sigma deviation anomaly is where an expected value and standard deviation is calculated for a given set of data. When new data is analyzed its deviation from the expected value is examined, and when it breaches a certain threshold it is deemed anomalous. For example all data points beyond 3 sigma may be considered anomalous. If the anomaly has information that describes why it is anomalous (for example outside of 3 sigma from the expected) then this can be used to set the level of acceptable loss of for the data that is anomalous and the data that is "normal". For example a high level of loss can be accepted in both the "normal" and "anomalous" areas if the anomaly is 10 sigma, because this anomalous data is far from the typical values. If the anomaly is 0.1 sigma for example there would be a much lower acceptable loss as the anomaly will be less visually obvious with such a small deviation from expected.

Variant/Invariant Anomalies: Anomaly detection can occur when the frequency of change in a measure is different from an expected value. In this case it is the lack of change, or the fact that the points are now much more similar to each other that is important. In this case high levels of loss in the data may be acceptable because the critical information is the change in frequency. It is simply required that the shape of the line conveys this information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may computer copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of down sampling time series data for display, comprising:
   determining an absolute distance between a previous data point in the series and a present data point; and
   discarding the present data point if the determined absolute distance is less than a threshold value, the threshold value being dependent on a data value range for a time series data, and a size of a display area within which the time series data is to be displayed;
   wherein determining the absolute distance comprises:
      determining a vertical size and a horizontal size of a display area within which the data is to be displayed;
      determining a vertical data range for the time series data;
      calculating a pixel to data value ratio;
      determining a duration of the time series data to be displayed within the display area;
      calculating a pixel to unit time ratio; and
      calculating a distance in absolute pixels between the present data point and the previous data point based on the calculated pixel to data value ratio, the calculated pixel to unit time ratio, and the data value and time for each of the present data point and the previous data point.

2. The method according to claim 1, comprising displaying the down sampled time series data.

3. The method according to claim 1, wherein the absolute distance is determined between a previously retained data point in the series and the present data point.

4. The method according to claim 1, comprising calculating the threshold value based on the data value range for the time series data, and on the size of the display area within which the time series data is to be displayed.

5. The method according to claim 1, comprising determining an anomalous region within the time series data, and discarding data points only outside of the anomalous region.

6. The method according to claim 5, wherein a region of the time series data is determined to be anomalous if it contains a data point which deviates from an expected value.

7. The method according to claim 1, comprising determining an anomalous region within the time series data, wherein a different threshold value is applied outside the anomalous region than within the anomalous region.

8. The method according to claim 7, wherein a region of the time series data is determined to be anomalous if it contains one or more data points which deviate from an expected value.

9. The method according to claim 8, wherein the threshold value applied to a data point within the anomalous region is dependent on an amount of deviation of that data point from an expected value.

10. The method according to claim 7, wherein a first threshold value is used within the anomalous region, a second threshold value is used in a region adjacent to the anomalous region, and a third threshold value is used elsewhere.

11. The method according to claim 10, wherein the first threshold value is smaller than the second threshold value, and the second threshold value is smaller than the third threshold value.

12. The method according to claim 1, wherein the data points within the time series data are processed in time sequence, and are displayed immediately following the determination as to whether they are to be retained or discarded.

13. The method according to claim 1, comprising analysing the time series data to determine a maximum data value and a minimum data value.

14. The method according to claim 13, wherein analysing the time series data comprises detecting one or more anomalous regions within the time series data.

15. A computer system for identifying word-senses, the computer system comprising:
   one or more computer processors;
   one or more computer-readable storage media;
   program instructions stored on the computer-readable storage media for execution by at least one of the one or more processors, the program instructions comprising:
      instructions to determine an absolute distance between a previously retained data point in the series and the present data point;
      instructions to discard the present data point if the determined absolute distance is less than a threshold value, the threshold value being dependent on a data value range for a time series data, and a size of a display area within which the time series data is to be displayed;
   wherein instructions to determine the absolute distance comprises:
      determining a vertical size and a horizontal size of a display area within which the data is to be displayed;
      determining a vertical data range for the time series data;
      calculating a pixel to data value ratio;
      determining a duration of the time series data to be displayed within the display area;
      calculating a pixel to unit time ratio; and
      calculating a distance in absolute pixels between the present data point and the previous data point based on the calculated pixel to data value ratio, the calculated pixel to unit time ratio, and the data value and time for each of the present data point and the previous data point.

16. The computer system of claim 15, comprising a display for displaying the down sampled time series data.

17. A computer program product for identifying word-senses, comprising a computer-readable storage medium having program code embodied therewith, the program code executable by a processor of a computer to perform a method comprising:
- determining an absolute distance between a previous data point in the series and the present data point; and
- discarding the present data point if the determined absolute distance is less than a threshold value, the threshold value being dependent on a data value range for a time series data, and a size of a display area within which the time series data is to be displayed;
- wherein determining the absolute distance comprises:
  - determining a vertical size and a horizontal size of a display area within which the data is to be displayed;
  - determining a vertical data range for the time series data;
  - calculating a pixel to data value ratio;
  - determining a duration of the time series data to be displayed within the display area;
  - calculating a pixel to unit time ratio; and
- calculating a distance in absolute pixels between the present data point and the previous data point based on the calculated pixel to data value ratio, the calculated pixel to unit time ratio, and the data value and time for each of the present data point and the previous data point.

* * * * *